United States Patent [19]

King

[11] Patent Number: 4,918,565

[45] Date of Patent: Apr. 17, 1990

[54] ELECTRICAL SURGE SUPPRESSOR

[76] Inventor: Larry J. King, P.O. Box 348, Clinton, N.C. 28328

[21] Appl. No.: 230,863

[22] Filed: Aug. 11, 1988

[51] Int. Cl.[4] ............................................. H02H 3/20
[52] U.S. Cl. .................................... 361/119; 361/120; 361/394
[58] Field of Search ............... 361/117, 118, 119, 122, 361/131, 120, 121, 124

[56] References Cited

U.S. PATENT DOCUMENTS

| | | | |
|---|---|---|---|
| 4,158,872 | 6/1979 | Stephanides | 361/128 |
| 4,683,514 | 7/1987 | Cook | 361/119 X |
| 4,692,833 | 9/1987 | Chung | 361/119 X |
| 4,729,055 | 3/1988 | Dorival et al. | 361/120 X |

Primary Examiner—Derek S. Jennings

[57] ABSTRACT

An electrical surge suppressor for use with a video satellite receiver system having an antenna, controls for positioning the antenna, a receiver, electrical conductors connecting the controls to the antenna and receiver, and coaxial cable means connecting the antenna to the receiver, the surge suppressor having a base member formed of a metallic and conductive material to which is mechanically and electrically coupled a dual ground block and a plurality of protector modules. Each module is connected to a control function electrical conductor of the satellite receiver system to protect the system when unwanted voltage surges are imposed on the conductor. Each module has a gas filled discharge tube, an air gap for shunting electrical impulse energy to ground potential when the discharge tube fails to clear the surge or fault, and a thermally operated spring loaded contact operable to shunt electrical impulse energy to ground when the discharge tube and air gap fail to shunt the surge to ground. If a surge occurs on the coaxial cable means or control function conductors between the antenna and the surge suppressor, the surge flows on the coaxial cable means or control function conductors from the antenna to the surge suppressor. If the surge occurs between the surge suppressor and the receiver, the surge flows from the receiver to the surge suppressor. The surge always flows to the surge suppressor because the path to ground through the suppressor is always less resistive and more conductive to surge flow no matter where the surge occurs in the satellite receiver system.

8 Claims, 6 Drawing Sheets

ELECTRICAL SURGE SUPPRESSOR

BACKGROUND OF THE INVENTION

I. Field of the Invention

The present invention relates to protective devices for suppressing short duration, high energy impulses or surges such as lightning strikes, which occur from time to time in video satellite receiver systems. More particularly, the invention relates to the use of a surge suppressor connected in series with conductors of a video satellite receiver and other components of a satellite receiver system.

II. Description of the Prior Art

The use of vacuum tubes in radio frequency transmitting and receiving equipment enables such equipment to tolerate nearby lightning strikes because the breakdown voltage of vacuum tubes is relatively high. Thus the tubes will usually not be damaged unless there is a direct lightning strike on the antenna or the feedline. Recent advances in solid state design technology have enabled transistors to replace vacuum tubes in most applications. The problems of surge protection or lightning strikes for transistorized receivers or transmitters is especially troublesome in view of the low breakdown voltages for typical solid state devices. Once the low breakdown voltage has been exceeded, the solid state device fails and must be replaced.

Surge protection equipment has been developed because of the significant cost in repairing and replacing solid state equipment. It is necessary that such equipment be designed to withstand multiple lightning strikes of reasonable intensity without the necessity of replacing the protective device and to avoid destruction of any equipment attached thereto. It is important, however, that the performance of the system in which the surge protective equipment is used not be degraded by the insertion of the protective device.

The present invention is invisible to the attached equipment which it is designed to protect and can sustain multiple lightning strikes without replacement or maintenance.

SUMMARY OF THE INVENTION

This invention relates to an electrical surge suppressor for dissipating electrical surges along a "receive only" transmission line of the type having multi-conductors within the same jacket or several individually jacketed wires with multi-conductors. The invention is especially well suited for use with a video satellite receiver system wherein a satellite antenna (sometimes referred to as a "dish") is positioned outside of and remote from the house or shelter which houses the television receiver to which it is connected. The suppressor is connected in series with the antenna, the receiver, and the conductors interconnecting these and other components of the system. The surge suppressor includes a base comprised of metallic and conductive material, a plurality of protector modules, and a dual ground block all of which are mechanically and electrically coupled to the base. The base serves as a common ground for the components of the suppressor and is connected to an external ground and to the grounds of the other components of the video satellite receiver system. Each module has a gas discharge tube, an air gap grounding back-up, and a thermally operated spring loaded contact operable to shunt electrical impulse energy to ground if the gas tube or air gap fails to do so. It also includes a ground block for protecting the coaxial signal carrying conductors. The modules (gas tube, air gaps, and thermal contacts) have known breakdown voltages.

DETAILED DESCRIPTION

Figure 1A:
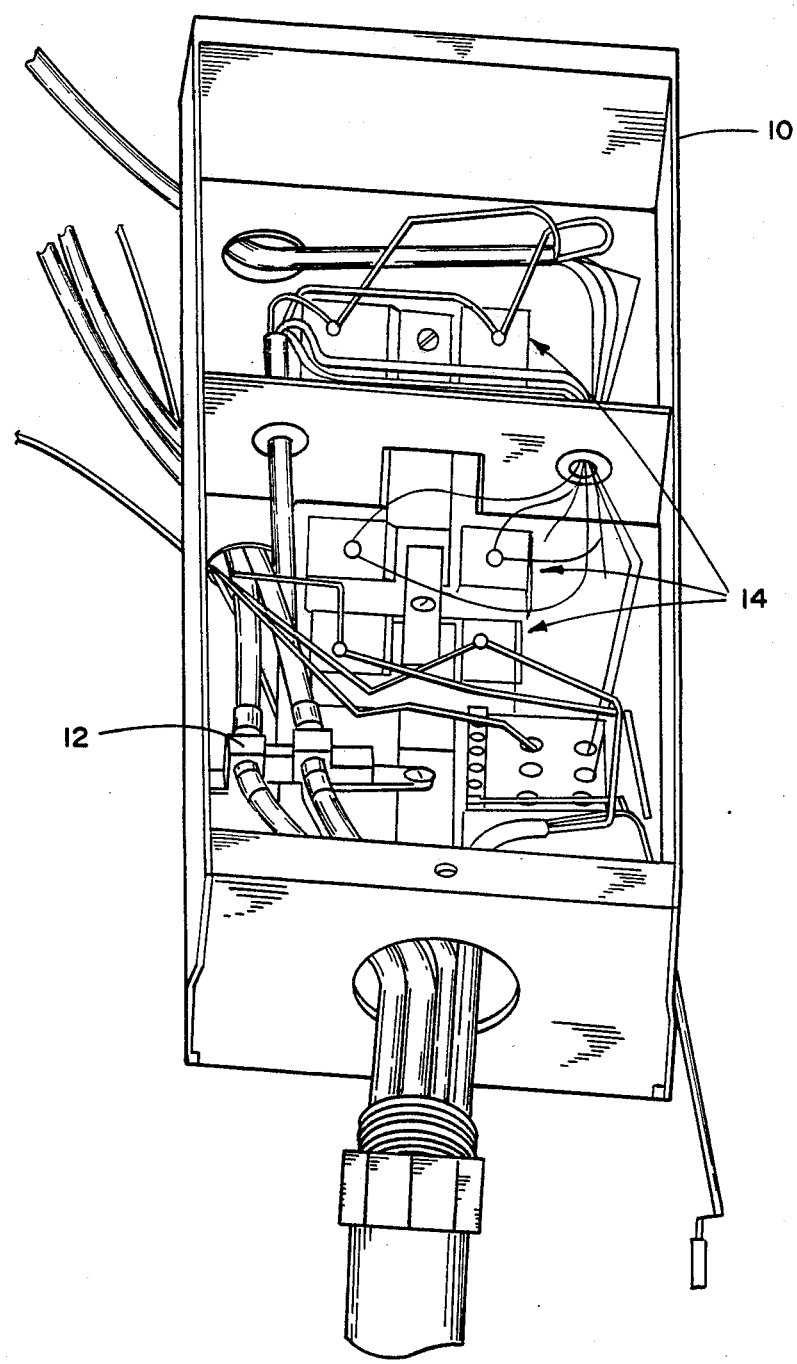
FIG. 1(a) is a perspective view of the electrical surge suppressor comprising the present invention showing the dual grounding block and the plurality of protector modules supported by the base member.
Figure 1B:
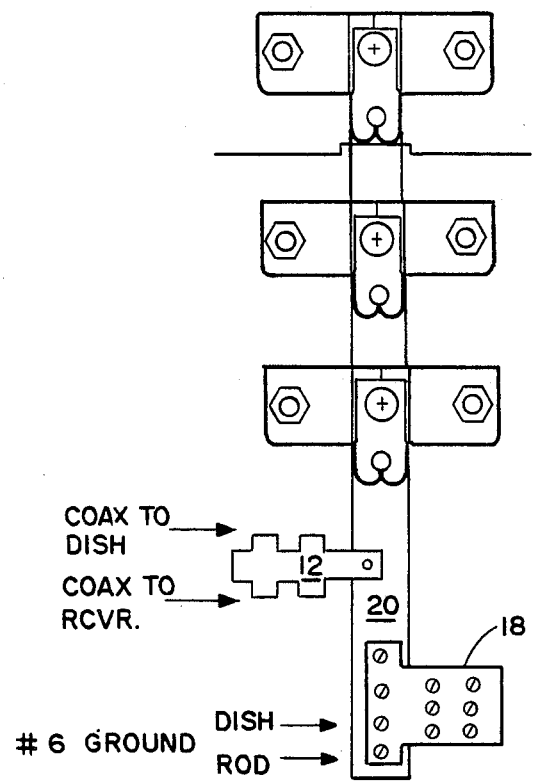
FIG. 1(b) is a schematic view of the grounding block and protector modules shown in FIG. 1(a).
Figure 3:
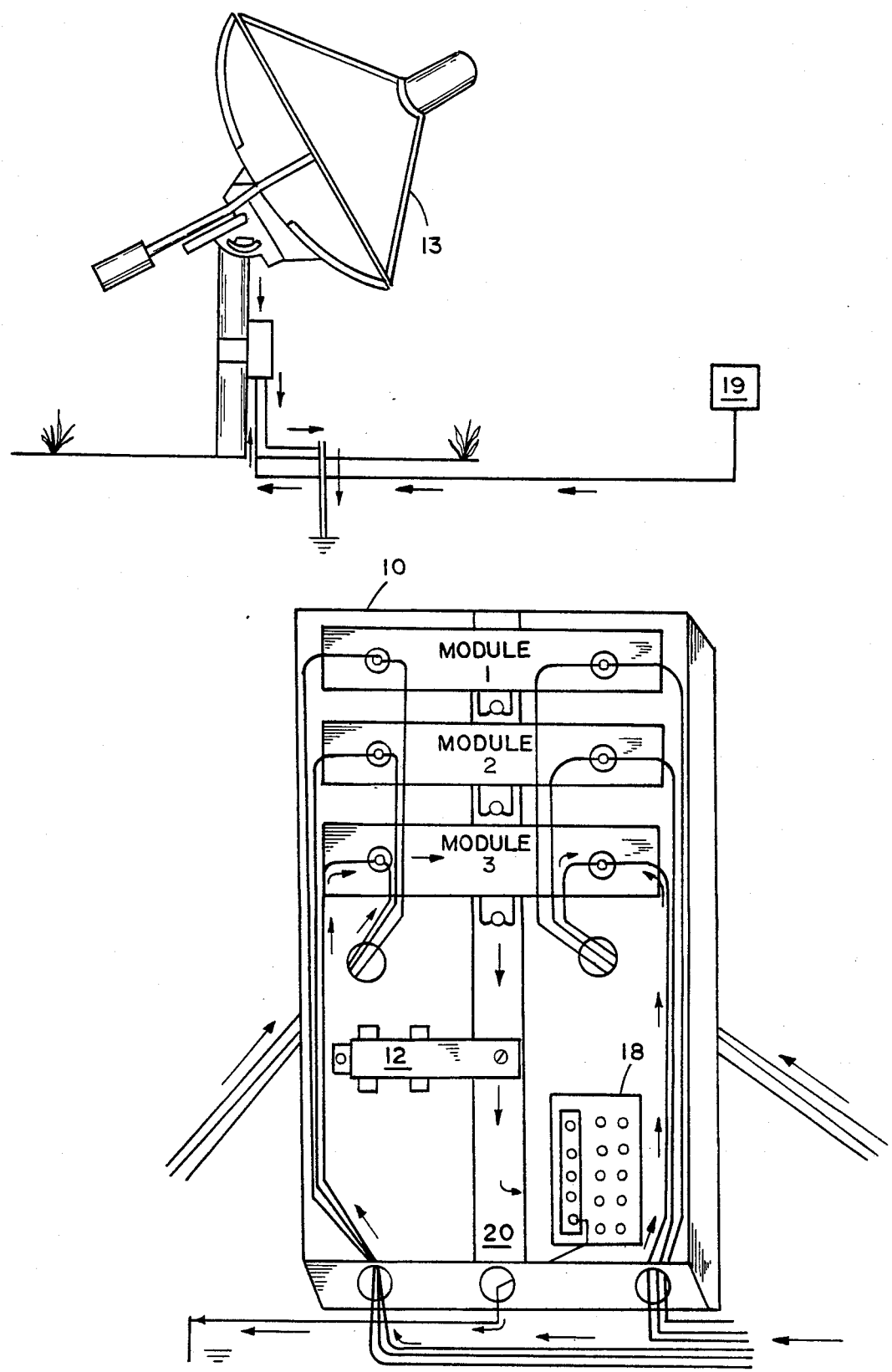
FIG. 3 is a ground flow chart of the control conductors utilized in the surge suppressor of the present invention.
Figure 4:
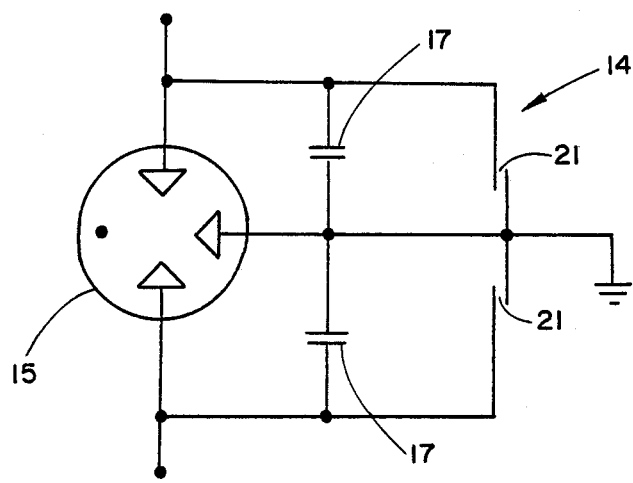
FIG. 4 is a schematic diagram of one of the protector modules and its associated components (gas tube, air gaps, and thermally operated spring loaded contacts) utilized in the present invention.

A first embodiment of the surge suppressor comprising the present invention is illustrated perspectively in FIG. 1. A base member 10 houses the components of the suppressor which include a dual grounding block 12 and three protector modules shown generally as f 14 each of which has as shown as in FIG. 4, a gas tube 15, air gap back-ups 17, and thermally operated spring loaded contacts 21. The modules 14 may be of the type produced by TII Industries, Inc. located at 100 North Strong Avenue in Lindenhurst, N.Y. and which are designated in its most recent sales brochure as Model No. 355. The air gap back-ups 17 may operate in the event the gas discharge to clear a surge. Contacts 21 will operate to shunt the surge to ground if the tube 15 and air gaps 17 both fail to clear the surge. The breakdown voltage of the TII 355 is approximately 300 VDC. As soon as the voltage across the tube exceeds the breakdown voltage, the rare gases within the associated tube ionize and form a shunt between the two sections of the tube and thus a path to ground. Each conductor is bridged across one of the gas tubes. As shown in FIG. 3 every conductor of the system is protected in that manner.

While the TII Model 355 module has been used most frequently with the present invention, other models namely the TII Model 356, may also be used effectively as an element of the suppressor.

Figure 2:
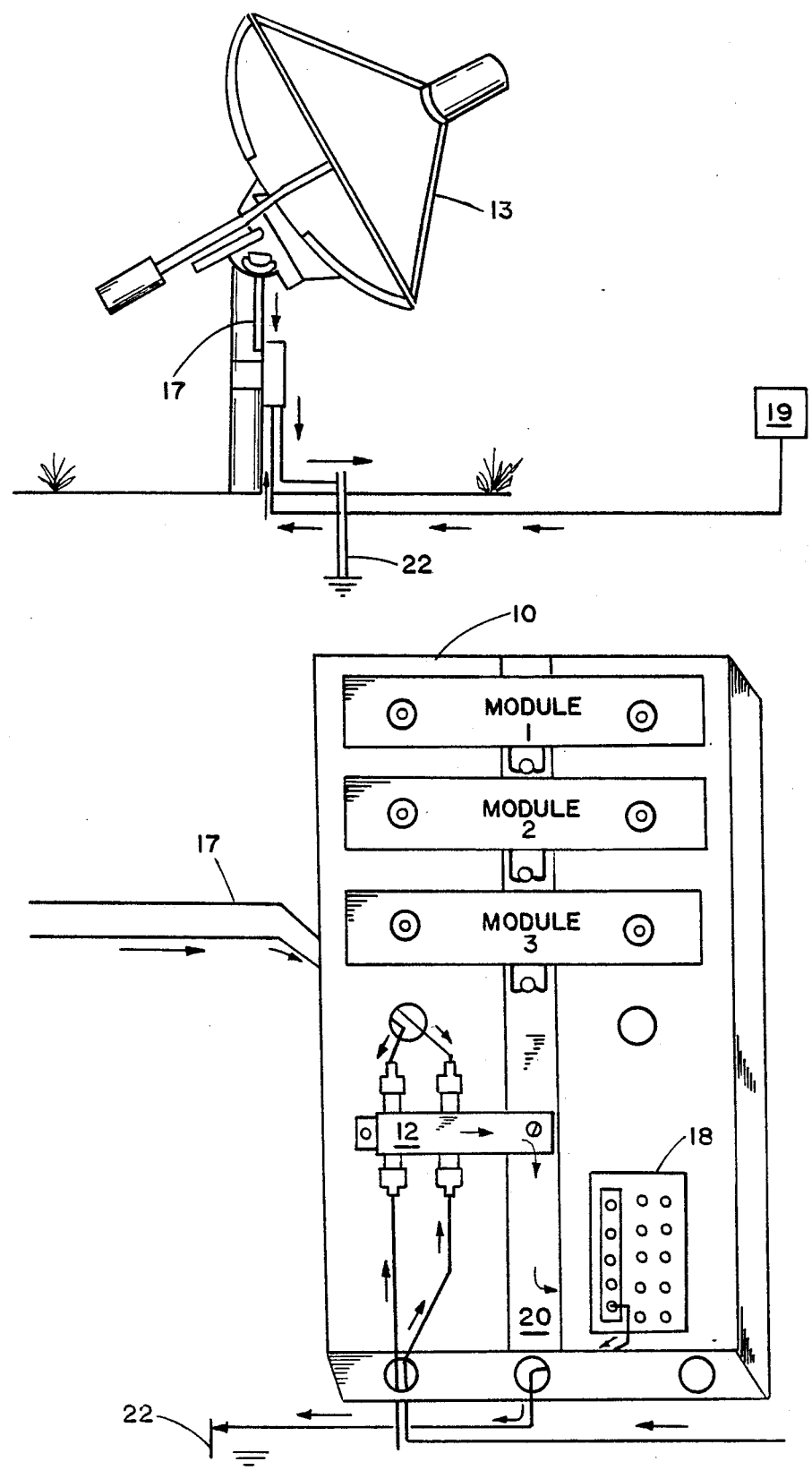
FIG. 2 is a ground flow chart of the coaxial cable means associated with the surge suppressor of the present invention.

FIG. 2 is a ground flow diagram with respect to the coaxial cable 17 connecting the satellite dish or antenna 13, the surge suppressor comprising the present invention, and the television receiver 19. Coaxial cable 17 from the satellite dish extends to the dual grounding block 12 which is positioned between the antenna 13 and receiver 19 preferably on the antenna supporting member. If a surge occurs on cable 17 between the antenna 13 and the surge suppressor, the surge flows from the antenna 13 to the suppressor as shown by the arrows. If the surge occurs on cable 17 between the surge suppressor and the receiver 19, the surge flows from the receiver 19 along cable 17 to the surge suppressor thus protecting in all cases the equipment of the system.

Base member 10 carries ground block 18 which is electrically connected to bus bar 20. The common ground of the system is connected to an external ground 22, preferably a ground rod of approximately 8 feet in length.

FIG. 3 illustrates the ground flow chart associated with the control function conductors of the system. If a surge occurs on a control function conductor between antenna 13 and the surge suppressor, the surge flows from the antenna along the conductor to the suppressor as shown by the arrows. If the surge is between the surge suppressor and the receiver 19, the surge flows from the receiver 19 along the conductor to the surge suppressor again protecting the equipment of the system.

Figure 5:
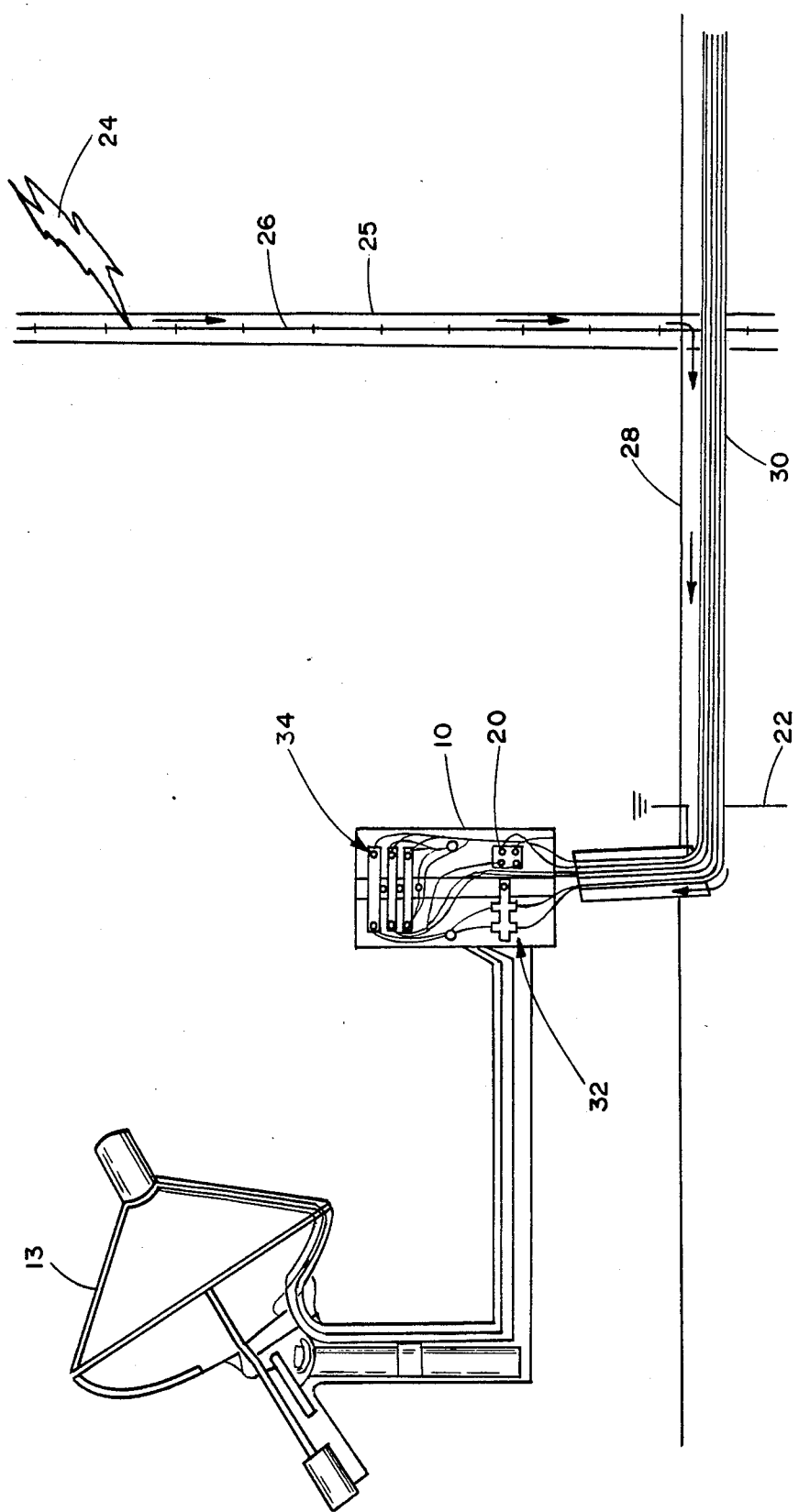
FIG. 5 is a ground flow utilizing all elements of the present invention illustrating its operation in the event of an electrical surge.

To illustrate the entire operation of the present invention in the event an electrical surge occurs, reference is made to FIG. 5 wherein lightning 24 strikes a utility pole 25 near a satellite TV antenna 13 of a video satellite receiver system utilizing the present invention. The surge created by the lightning strike flows down the utility pole primarily through the bare copper wire attached thereto and indicated as 26.

As the surge reaches ground level 28 it jumps onto the multi conductor cable 30 and flows to base member 10. The surge is present on all conductors in the cable. Because the surge suppressor provides a more receptive path to ground, that portion present on coaxial cable 17 will flow to ground at point 12 while that part of the surge present on the control cable conductors will flow to ground at point 34. The surge dissipated at points 12 and 34 flows into bus bar 20 that is electrically and mechanically coupled to ground rod 32. Thus the surge dissipates to ground through ground rod 22, and the surge compressor comprising the present invention is ready to receive and dissipate another fault or surge without any maintenance or replacement of parts.

The present invention thus provides surge dissipation in a very efficient manner, with the surge control being located out of the home or television receiver shelter near the antenna and away from home occupants or viewers to provide safer surroundings. Maximum efficiency is achieved when the ground of the system is perfected to the greatest extent possible.

The embodiments of the present surge suppressor have been described as examples of the invention as claimed. However, the invention should not be limited in its application to the details and constructions illustrated in the accompanying drawings and in the specification, it may be practiced or constructed in a variety of other different embodiments. It is understood that the terminology and descriptions employed herein are used solely for the purpose of describing the general concepts of the invention and the preferred embodiment best exemplifying those concepts should not be construed as limitations on the invention or its operability.

I claim:

1. An electrical surge suppressor for use with and as protection for a video satellite receiver system havng an antenna, a television receiver located remote from the antenna, coaxial cable means connecting the antenna to the receiver, and a ground mechanically and electrically joining the antenna, receiver, and cable means, said surge suppressor comprising: a base member connected to ground; a dual ground block mechanically and electrically connected to said base member for carrying video signals within the coaxial cable means of the system; a plurality of protector modules each of which is mechanically and electrically connected to a single control function conductor of the system and communicable with the ground whereby the suppressor will shunt electrical impulse energy to ground without damage to the components of the video satellite receiver system, replacement of the elements of the surge suppressor, or distortion of the video signal.

2. The surge suppressor as claimed in claim 1 wherein each of said modules has a discharge tube filled with a gas other than air.

3. The surge suppressor as claimed in claim 2 wherein each of said modules has an air gap for shunting electrical impulse energy to ground when said gas discharge tube fails to function.

4. The surge suppressor as claimed in claim 1 wherein said base member and dual ground block are electrically and mechanically connected to the ground.

5. The surge suppressor as claimed in claim 2 wherein said base member and dual ground block are electrically and mechanically connected to the ground.

6. The surge suppressor as claimed in claim 3 wherein each of said modules has at least one thermally operated spring loaded contact operable to shunt electrical impulse energy to ground when said gas discharge to and said air gap fail to shunt the impulse energy to ground.

7. The surge suppressor as claimed in claim 1 wherein the ground connections of the antenna and receiver are connected to the ground of the dual ground block and the protector modules.

8. The surge suppressor as claimed in claim 6 wherein the ground connections of the antenna and receiver are connected to the ground of the dual ground block and the protector modules.

* * * * *